United States Patent [19]
Davis et al.

[11] Patent Number: 5,459,600
[45] Date of Patent: Oct. 17, 1995

[54] OPTICAL TELECOMMUNICATIONS SYSTEM EMPLOYING MULTIPLE PHASE-COMPENSATED OPTICAL SIGNALS

[75] Inventors: Charles M. Davis; Marvin W. Ward, both of Centreville; Clarence J. Zarobila, Leesburg, all of Va.

[73] Assignee: Optimux Systems Corporation, Centreville, Va.

[21] Appl. No.: 207,121

[22] Filed: Mar. 8, 1994

[51] Int. Cl.$^6$ .................................................. H04B 10/12
[52] U.S. Cl. .......................... 359/173; 359/115; 359/135; 356/345
[58] Field of Search .................................. 359/115, 125, 359/127, 133, 157, 164, 173, 183, 188, 195, 279, 161; 356/345; 250/227.19, 227.27; 385/3, 12, 14, 24, 31

[56] References Cited

U.S. PATENT DOCUMENTS

| | | | |
|---|---|---|---|
| 4,477,423 | 10/1984 | Sanders | 423/328 |
| 4,699,513 | 10/1987 | Brooks et al. | 350/345 |
| 4,728,191 | 3/1988 | Zarobila | 350/345 |
| 4,743,113 | 5/1988 | Jubinski | 250/227.19 |
| 4,755,668 | 7/1988 | Davis | 250/227 |
| 4,848,906 | 7/1989 | Layton | 356/345 |
| 4,860,279 | 8/1989 | Falk et al. | 359/115 |
| 4,866,698 | 9/1989 | Huggins et al. | 359/181 |
| 4,882,775 | 11/1989 | Coleman | 359/115 |
| 5,191,614 | 3/1993 | LeCong | 380/49 |
| 5,223,967 | 6/1993 | Udd | 359/119 |
| 5,327,214 | 7/1994 | Asami | 385/12 |

Primary Examiner—David K. Moore
Assistant Examiner—Kinfe-Michael Negash
Attorney, Agent, or Firm—Lowe, Price, LeBlanc & Becker

[57] ABSTRACT

Optical telecommunication systems using phase-compensation interferometry wherein receiver units have N interferometer configurations each with a unique path length difference that is identical to a path length difference in one of N interferometer configurations at the corresponding transmitter units. The transmitter and receiver units separately and individually use N+1 arms, one of which serves as a reference common to the other N arms that along with the common reference arm form the N interferometer configurations of the transmitter and receiver units. N phase modulators, one in each of the N paths of the transmission units, are used to apply a separate and individual telecommunication signal (payload) to the portion of the light in that path. These N separate payloads may be of the same or different protocols. These N separate payloads may have the same or different bit rate/second. These N separate payloads may be digital or analog. These N payloads may be individually and separately dropped out or inserted at a drop/insert site. These N separate payloads may be used to increase the capacity of a transmission path by a factor of up to N. These N separate payloads may be used to employ lower bit rate/second electrons to produce a higher bit rate/second payload where the increased in bit rate/second is a factor of up to N.

26 Claims, 5 Drawing Sheets

OPTICAL TELECOMMUNICATIONS SYSTEM EMPLOYING MULTIPLE PHASE-COMPENSATED OPTICAL SIGNALS

BACKGROUND OF THE INVENTION

This invention relates to an optical telecommunications system. More specifically, this invention relates to an optical telecommunications system which uses multiple phase-compensated optical signals.

At present, digital and analog transmission employ a variety of systems for telecommunications including point-to-point microwave radio, optical fiber cable link, copper cable link, and communication satellite transmission. Such systems are used for transmitting telephone calls, television signals, and other audio and/or visual signals as well as various data telecommunications. In recent years, the trend has been towards the use of increasing numbers of optical fiber links. Such systems generally use optical fiber in a passive role for transmitting data and communications point-to-point using conventional electronics for all applications and multiplexing requirements. That is, the optical fiber cable between the transmitter and receiver is essentially a dumb link. The trend in recent years has been towards higher and higher data transmission rates reaching into the Gb/s range. This requires the use of more costly electronic components and optical sources. Much of the early single-mode fiber that has been deployed is unable to accommodate these high transmission rates. Furthermore, a variety of protocols are presently in use. These include DS3, SONET, International (E3), ATM, etc. When several of these are to be transmitted simultaneously over a common bus, it is necessary to digitally convert them to a single protocol.

In present systems, information is usually multiplexed in time-division format. The diverse signals are multiplexed together by combining them temporally. For example, 24 digital signal zero (DS0) level signals are sampled sequentially and combined to form the next level of signal transmission, which is T1 (DS1). The outputs of 4 T1 transmitters may be sampled and stacked sequentially in time by a T2 (DS2) multiplexer. Similarly, the outputs of 28 T1 or 7 T2 transmitters may be sequentially sampled and combined by a T3 (DS3) multiplexer. This process of combining or multiplexing lower level telemetry signals is repeated many times until signals in the GB/s range are produced.

The above approach has a number of disadvantages. European protocol differs from U.S. protocol. Thirty-two DS0 signals are combined by an E1 multiplexer, the European counterpart of T1. Thirty E1 channels transmit DS0 signals while the other two channels are used for signaling and alarm/supervision purposes. In general, European and U.S. standard telemetry is not mixed. The byte rates and formats differ. Likewise, while DS3 and synchronous optical network (SONET) formats may be combined in the same transmission facility, the DS3 is limited to non-drop/insert applications. In other words, such arrangements make it difficult to drop out signals and insert other signals at intermediate ends of the transmission path. In such cases, at a point further down the facility, a portion of the signals are separated and diverted from the cable, while the remainder plus some additional information inserted at the same location continues to propagate along the cable. However, at such points, the multiplexed signal must be electronically broken down into basic DS3, DS2, DS1, DS0, ATM wideband, and fractional wide band data operating at DS3 and SONET rate, sorted, and recombined. This requires significant quantities of electronics including both a digital demultiplexer, one or more multiplexers and microprocessors as illustrated in the prior art FIG. 1.

In the case of SONET protocol, the payloads in the optical cable use standard bit rates of 51.84 Mb/s (optical carrier level 1 or OC1), 155.52 Mb/s (OC3), 622.08 Mb/s (OC12), 1.244 Gb/s (OC24), and 2.488 Gb/s (OC48) and above. The corresponding electronic interfaces are designated as synchronous transport level 1 (ANSI=STS-1), STS-3 equivalent to synchronous transport module level 1 (CCITT=STM-1), STS-12/STM-4, STS-24, and STS-48/STM-16, respectively and above. Much of the original single mode fiber deployed is unable to transport payloads in the Gb/s range.

U.S. Pat. No. 4,477,423, issued Oct. 16, 1984 to Edward F. Carome and one of the present inventors', Charles M. Davis, prior and hereby incorporated by reference, discloses a technique of using optical phase modulation to detect electric fields. An interferometer configuration is used.

U.S. Pat. No. 4,755,668, issued Jul. 5, 1988, to one of the present inventors', Charles M. Davis, prior and hereby incorporated by reference, discloses optical phase modulation interferometer techniques for use with a plurality of sensors where the optical signal corresponding to each sensor is separately and individually distinguished by a fixed optical phase difference. A separate and individual interferometer configuration is used for each sensor. These interferometers are distinguished from each other by the path length differences between the two arms of the interferometers.

U.S. Pat. No. 4,728,191, issued Mar. 1, 1988, to one of the present inventors', Clarence J. Zarobila, prior and hereby incorporated by reference, discloses the use of phase-compensation interferometry employing a 3×3 coupler/splitter.

The following patents disclose various other phase modulation techniques for use with telecommunications and/or sensors:

| Patent No. | Inventor |
| --- | --- |
| 4,699,513 | Brooks et al |
| 4,848,906 | Layton |
| 4,860,279 | Falk et al |
| 4,866,698 | Huggins et al |
| 4,882,775 | Coleman |
| 5,191,614 | LeCong |
| 5,223,967 | Udd |

Although the above and other techniques have been generally useful, they have often been subject to one or more disadvantages. For example, the capacity to carry a high bit rate payload within a single transmission path, such as optical fiber, is often limited. Generally, drop/insert operations (picking off a signal and inserting another signal) at an intermediate stage in a transmission path require complex electronics. Some techniques provide questionable security for transmission of telecommunications such as audio, video, and/or data. Some techniques do not readily or easily provide full duplex transmission within a single fiber. Some prior techniques do not readily allow redundant transmissions. Most techniques do not allow simultaneous transmission of the various different protocols. Most techniques do not allow simultaneous transmission of analog and digital data. Most techniques require complex, high speed digital electronics in order to transmit high Mb/s and Gb/s payloads.

OBJECTIVES AND SUMMARY OF THE INVENTION

Accordingly, it is a primary object of the present invention to provide a new and improved optical telecommunication system.

A more specific object of the present invention is to provide an optical telecommunication system with a high capacity.

A further object of the present invention is to provide an optical telecommunication system with a reduced number of optical components for multiplexing various payloads on the same optical transmission path and demultiplexing various payloads from the same optical transmission path.

Still another object of the invention is to provide a simplified means for separately and individually optically inserting and dropping a portion of the optical payload in an optical transmission path.

Yet another object of the present invention is to provide an optical telecommunication system avoiding or minimizing the disadvantages discussed above with respect to various prior techniques and where optical paths, such as optical fibers, have more utility than simply serving as dumb links.

The above and other features of the present invention which will be more readily understood when the following detailed description is considered in conjunction with the accompanying drawings are realized by an optical telecommunication system having a first transmission unit operably connected to a first receiver unit by a transmission path having a first end adjacent to the first transmission unit and a second end adjacent to the first receiver unit. The first transmission unit has one or more sources of radiant energy with a coherence length. The source or sources may or may not be included in the first transmission unit. The first transmission unit further includes N+1 optical paths, where one path is used as a reference and the remaining N paths are used to introduce N signals individually and separately to the N paths and means for dividing radiant energy from the source or sources into the N+1 portions for passage respectively along the N+1 paths and for recombining the N+1 portions after passage along the N+1 paths and N paths are selected such that their lengths separately and individually differ from the reference path by amount $\Delta L_1, \Delta L_2, \ldots \Delta L_N$, respectively, where all such path length differences are greater by a factor of five (or less) than the coherence length, and any difference $\Delta L_k - \Delta L_j$ must be greater by a factor of five or less than the coherence length and not equal to any other path length difference $\Delta L_1, \Delta L_2, \ldots \Delta L_N$. For simplicity, the N−1 paths as used herein will refer to N−1 paths in the transmission unit. The first transmission unit further includes a phase modulator in each of the N paths operable for applying a telecommunications signal to the respective portion of light in that optical path. These N+1 paths and the corresponding N phase modulators and the means for dividing the radiant energy from the source into the N+1 portions and the means for recombining the N+1 portions may be implemented as single-mode optical fiber or single-mode integrated optical waveguides formed on a suitable electro-optic substrate such as lithium niobate or gallium arsenide.

In one embodiment, the means for dividing and recombining, and the N+1 paths are part of N Mach-Zehnder configurations each of which consists of two paths one path of which is the reference path and the other path of which is one of the remaining N paths. Since, the same identical path constitutes the reference for all N Mach-Zehnder configurations in that embodiment, N+1 paths is all that is needed for forming the N Mach-Zehnder configurations instead of the 2N paths required for N separate and individual Mach-Zehnder configurations. This results in a reduction of N−1 paths thereby allowing nearly twice the number of Mach-Zehnder configurations to be configured as single-mode optical waveguides formed on a suitable electro-optic substrate such as lithium niobate or gallium arsenide. The means for dividing and recombining includes a coupler/splitter having one input port and N+1 output port, hereafter identified as a 1×(N+1) splitter connected to split the radiant energy into the N+1 portions and a (N+1)×1 coupler/splitter to recombine the N+1 portions, hereafter identified as a (N+1)×1 coupler. As used hereafter, a coupler/splitter will generally be referred to as a splitter if used for splitting signals, a coupler if used for coupling signals, and a coupler/splitter if used for both coupling and splitting signals.

In an optical fiber embodiment the means for dividing and recombining are a (N+1)×(N+1) splitter connected to split the radiant energy into the N+1 portions and a (N+1)×(N+1) coupler to recombine the N+1 portions.

In an alternate embodiment, the means for dividing and recombining N+1 paths are part of N Michelson configurations wherein one path of each Michelson configuration is the reference path and the other path in each Michelson configuration is one of the remaining N paths. Since, the same path constitutes the reference for the N Michelson configurations in that embodiment, N+1 paths constitutes N Michelson configurations instead of the 2N paths required for N separate and individual Michelson configurations. This results in a reduction of N−1 paths thereby allowing nearly twice the number of Michelson interferometer configurations to be configured on a single optical integrated substrate. The means for dividing and for recombining in this configuration is a coupler/splitter.

The first receiver unit has N separate pairs of first and second reception paths and means for reseparating the N portions for passage separately and respectively to the N pairs of first and second reception paths. Each of the first and second reception pairs has a means for dividing that portion of the radiant energy from the source into first and second portions for passage respectively along the first and second paths and for recombining the first and second portions after passage along the first and second paths. In each of the N pairs the length of the first reception path corresponds to that of the reference path in the transmission unit and the second reception path has a length that differs from the reference path by an amount $\Delta L_j \pm$ an amount less than the source coherence length (the subscript j assumes an individual value between 1 and N). No two pairs of first and second reception paths have the same $\Delta L_j$ difference. The first receiver unit further includes N first sensors separately and individually connected to the means for recombining the N pairs of first and second reception paths, each first sensor operable to sense radiant energy for detection of the telecommunication signal applied to the first transmission unit having the same $\Delta L_j$ path length difference. Each first transmission unit and the first receiver unit having the same $\Delta L_j$ path length difference collectively are an interferometer.

In one receiver embodiment, the means for dividing and recombining the first and second paths of each of the N pairs are part of a Mach-Zehnder configuration. For that embodiment, the means for dividing and recombining includes a splitter connected to split the radiant energy into the first and second portions and a coupler to recombine the first and second portions.

In an alternate embodiment, the means for dividing and recombining and the first and second paths are part of a Michelson configuration. The means for dividing and for recombining in this configuration is a coupler/splitter.

The first and second optical paths of each N pairs may be optical fibers or formed on an integrated optic substrate. The coupler/splitters may also be formed on the integrated optic substrate. Finally, more than one pair and the corresponding coupler/splitters may be combined on the same integrated optic substrate.

The source may be one or more lasers or superluminescent diodes (type of light-emitting diode).

In one embodiment of the invention a second transmission unit constructed in like fashion as the first transmission unit is included in the system. The system further includes a transmission splitter connected to split radiant energy from the source into portions directed separately to the first and second transmission units and a transmission coupler connected to recombine radiant energy which is passed through the first and second transmission units and which is connected to the transmission path. The means to direct radiant energy to the first and second transmission units may have path length differences that are as large as a thousand coherence lengths in order that there be no path through one transmission unit that has a path length difference with respect to a path through the other transmission unit that is close to the any individual path length differences in either of the transmission units separately. A second receiver unit constructed in like fashion as the first receiver unit is operably connected to the second end of the transmission path. The first and second receiver units respectively recover signals applied to the first and second transmitter units. Both transmission units and both receiver units and the splitters used to split the radiant energy between the transmission units and between the receiver units and the coupler used to combine the radiant energy from the two transmission units may be optical fiber devices or located on the same integrated optic substrate.

In another embodiment of the invention, a second transmission unit is connected at the second end of the transmission path and a second receiver unit is connected at the first end of the transmission path. The first and second receiver units respectively recover signals applied to the first and second transmitter units such that full duplex communication is provided.

In a drop/insert embodiment of the present invention, an intermediate station is provided in the telecommunication system. The intermediate station is on the transmission path between the first and second ends. The intermediate station includes a second transmission unit operably connected to an intermediate location of the transmission path and a second receiver unit operably connected to an intermediate location of the transmission path.

In another embodiment an electro-optic switch is provided at the output of each of the transmission units in order to allow a fraction of the radiant energy to be tapped off for other transmission or diagnostic purposes.

In another embodiment an electro-optic switch is provided at the input to each receiver unit in order to allow a fraction of the radiant energy to be tapped off for other transmission or diagnostic purposes.

In another embodiment a splitter is provided at the output of each transmission unit in order to allow the radiant energy to be transmitted along two or more different transmission paths such as for redundant or for token ring applications.

In another embodiment and electro-optic switch is provided at the input to each receiver unit in order to allow the radiant energy to be received along two or more different receiver paths for redundant or token ring applications.

In another embodiment of the invention two sources of radiant energy are provided in the transmission unit for redundancy and a remotely controlled switch is provided between the sources and a first means for dividing the radiant energy into N+1 portions, said switch directs radiant energy from one or the other of the optical sources to the means for dividing the radiant energy into the N+1 portions.

The electro-optic switches and splitters in the above embodiments may be configured on the same integrated optic substrates as the transmission and receiver units.

The present invention may alternatively be described as an optical telecommunication system comprising a first receiver unit as recited above.

BRIEF DESCRIPTION OF THE DRAWINGS

The above and other features of the present invention will be readily understood when the following detailed description is considered in conjunction with the accompanying drawings wherein like characters represent like parts throughout the several views and in which.

Detailed Description

Figure 1:
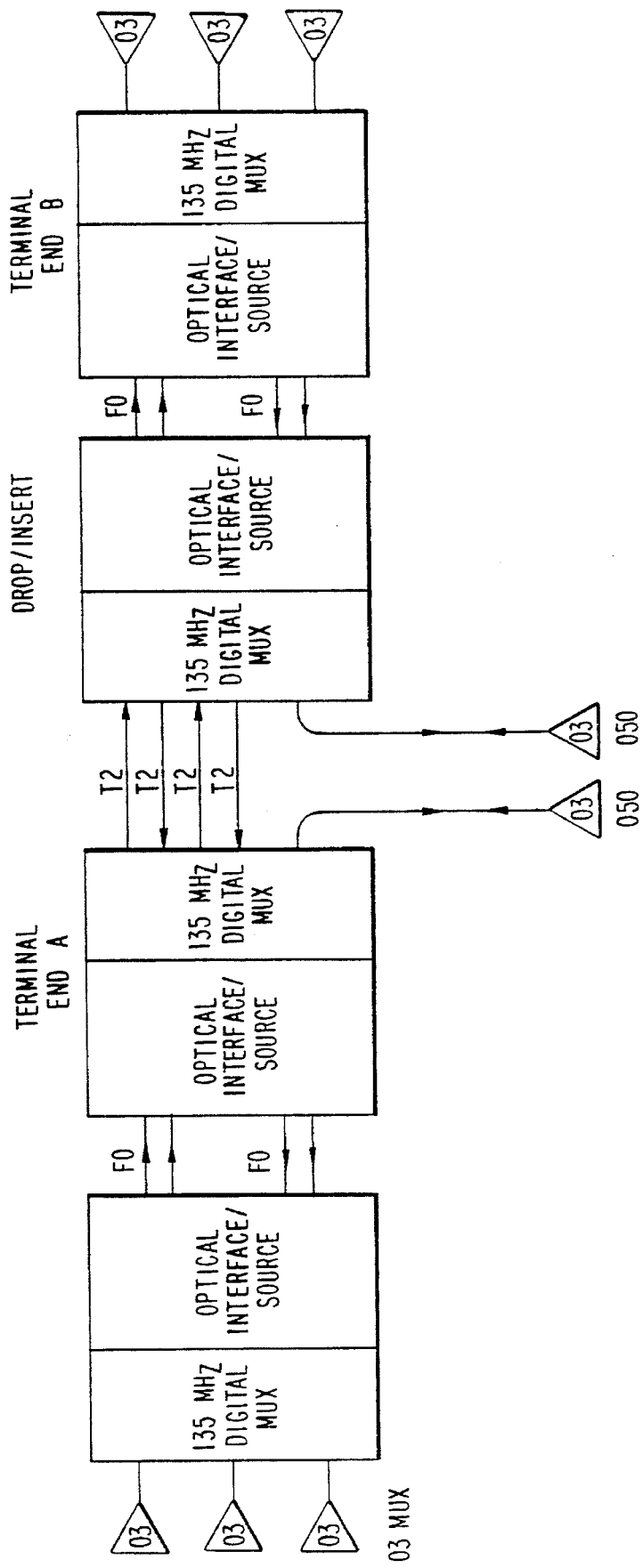
FIG. 1 shows a prior art communication system.
Figure 2:
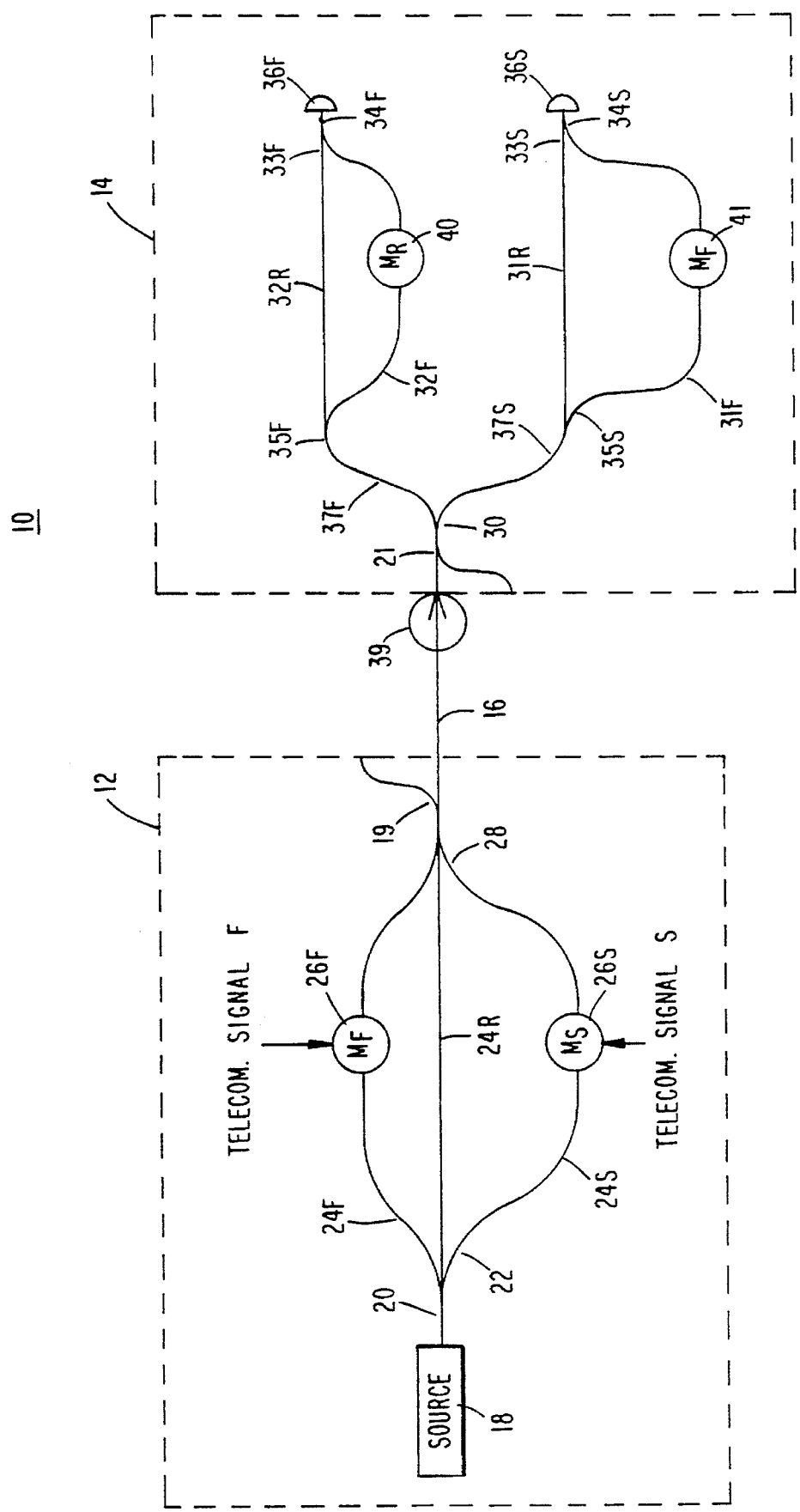
FIG. 2 shows a schematic of a first embodiment telecommunication system according to the present invention.

Turning now to FIG. 2, a first embodiment optical telecommunication system 10 according to the present invention (where N =2 corresponding to the simplest such embodiment) is shown as including a transmitter unit 12 connected to a receiver unit 14 by way of a transmission path 16, which is shown as an optical fiber.

The transmitter unit 12 includes a source 18 of radiant energy connected by a source path 20 (which may be either an optical fiber or integrated optic waveguide) to a 1×3 branching waveguide coupler/splitter (or 3×3 fiber-optic coupler/splitter). As used hereafter, a coupler/splitter will generally be referred to as a splitter if used for splitting signals, a coupler if used for coupling signals, and a coupler/splitter if used for both coupling and splitting signals. The splitter 22 divides radiant energy from the source 18 into first, second, and third portions which travel down first, second, and third optical paths 24F, 24R, and 24S respectively. Optical path 24F is greater than optical path 24R by an amount $\Delta L_1$ which is about five times the coherence length of the source 18 but may be less and has a phase modulator 26F for applying a telecommunication signal to the first portion of the radiant energy passing through optical path 24F. Optical path 24S is greater than optical path 24R by an amount $\Delta L_2$ that is greater than $\Delta L_1$ by about five times the coherence length of the source 18 but may be less and has a phase modulator 26S for applying a second telecommunication signal to the second portion of radiant energy passing through optical path 24S. The optical paths 24F, 24R, and 24S may be optical fibers or integrated optic waveguides. The first, second, and third portions of radiant energy travelling respectively along paths 24F, 24R, and 24S are recombined by coupler 28.

The configuration for the transmitter unit 12 will be recognized as two Mach-Zehnder interferometers sharing a common reference arm 24R.

The splitter 22 and coupler 28 collectively serve as a means for dividing and recombining the radiant energy from source 18 into the first, second, and third portions.

The optical phase modulators 26F and 26S may be integrated electro-optic, electrostrictive, piezoelectric or acousto-optic devices or some other such family of phase modulators. The preferred embodiment is the integrated electro-optic phase modulator formed on a suitable electro-optic substrate such as lithium niobate or gallium arsenide. The phase modulators 26F and 26S together with optical paths 24F, 24R, and 24S (that may be constructed as integrated optic waveguides on the electro-optic substrate), source 18, source path 20, splitter 22, and coupler 28 may all be part of the single electro-optic substrate. In that case, the source 18 would preferably be a superluminescent diode. Superluminescent diodes exhibit typical coherence lengths of about 20 μm. Although the transmission units are shown as Mach-Zehnder configuration units, they alternatively may be Michelson or other configurations. Where the paths 24F, 24R, and 24S are realized by optical fibers, the source 18 would usually be a low coherence length single mode laser having a typical coherence length of a few centimeters.

The signals on transmission path 16 enter into the first side of a splitter 30 within receiver unit 14. At the second side (right side in FIG. 2) of splitter 30, light is supplied to two different optical reception paths 37F and 37S. The portion of light in 37F is divided by splitter 35F into paths 32R and 32F and recombined by coupler 33F. Optical path 32F is greater than optical path 32R by an amount $\Delta L_1$. The output of coupler 33F (the right side in FIG. 2) is delivered to sensor 36F in order to recover the signal introduced by modulator 26F. The portion of light in 37S is divided by splitter 35S into paths 31R and 31S and recombined by coupler 33S. Optical path 31S is greater than optical path 31R by an amount $\Delta L_2$. The output of coupler 33S (the right side in FIG. 2) is delivered to sensor 36S in order to recover the signal introduced by modulator 26S. In certain embodiments, it may be desirable to include means for adjusting the optical path length of one of each pair of receiver paths. Modulators may be located in one optical receiver path of each pair for this purpose. The adjustment voltage could be applied by manual means or by means of a suitable feedback circuit of a type well known in this art. In FIG. 2 modulators 40 and 41 are shown located in paths 32F and 31F, respectively. Although not shown in other embodiments, such modulators may be used with each receiving unit discussed below if needed.

That portion of light which passes through transmitter path 24R and receiver path 32F travels the same distance (to within a quantity less than the coherence length of the source 18) as that portion of light that passes through transmitter path 24F and receiver path 32R. Likewise, that portion of light that passes through transmitter path 24R and receiver path 31S travels the same distance (to within a quantity less than the coherence length of the source 18) as that portion of light which passes through transmitter path 24S and receiver path 31R. Accordingly, the light applied to sensors 36F and 36S will have interference patterns dependent upon the phase modulation introduced by phase modulators 26F and 26S, respectively, thus containing the telecommunication signals.

The sensors 36F and 36S, which may be photodetectors, convert the light into electrical signals which contain the information introduced by means of modulators 26F and 26S.

An optical isolator 39, which passes light in one direction only, is used to block light from travelling back out of the receiving unit. Although not shown in other embodiments, such an isolator may be used with each receiving unit discussed below, especially in the duplex arrangements or in arrangements where secure communications are sought.

Item 19 in the transmission unit 12 and item 21 in receiver unit 14 are alternate paths provided by means of an electro-optic switch or coupler/splitter. Although not shown in other embodiments items 19 and 21 may be used with each receiving and transmission unit.

Figure 3:
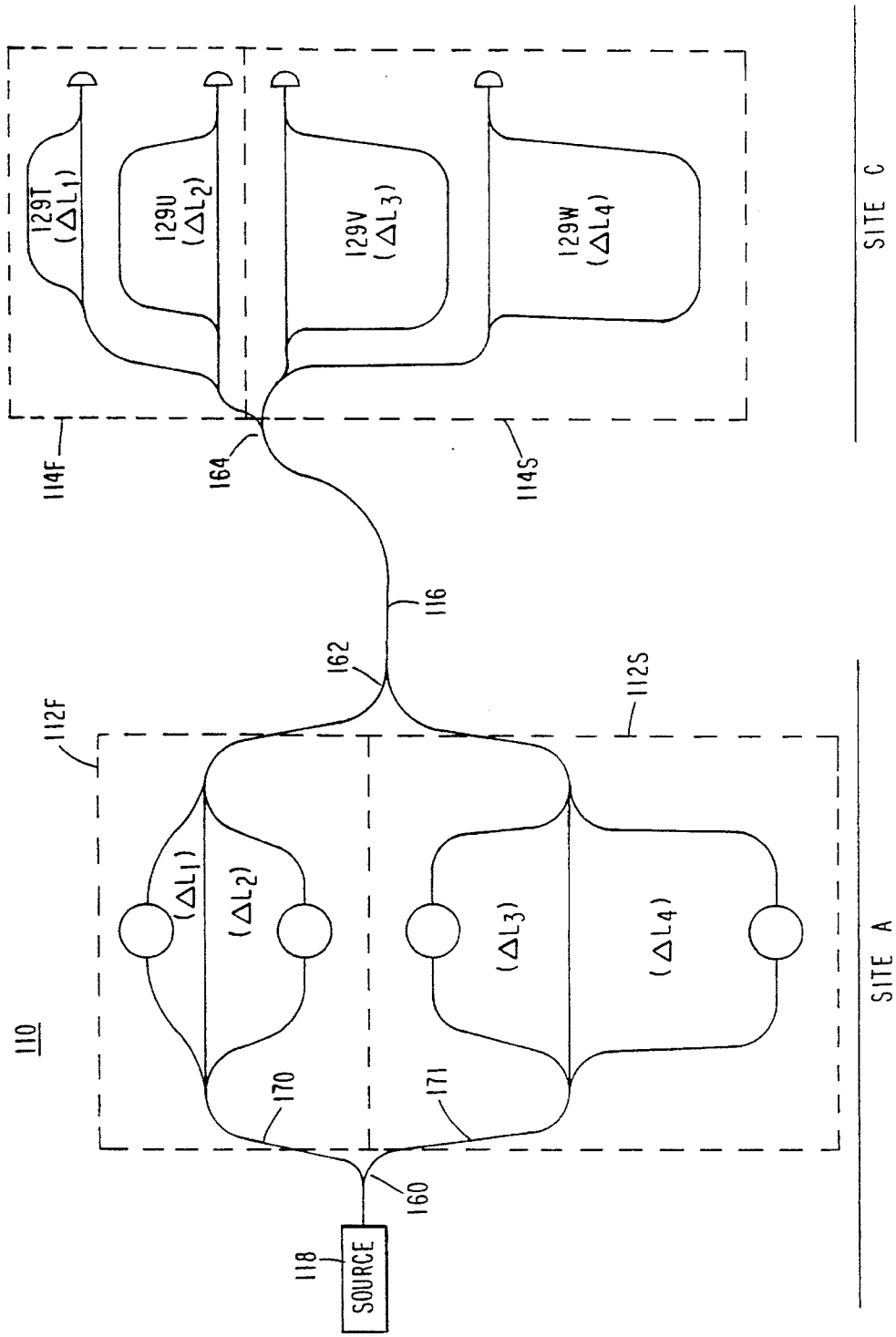
FIG. 3 shows a second embodiment telecommunication system according to the present invention in which multiple transmitters are at one end and an alternate receiving configuration is at another end.

Turning now to FIG. 3, an arrangement for multiplexing a plurality of signals at site A on transmission line 116 and demultiplexing the signals at site C is shown. The components in the telecommunications system 110 shown in FIG. 3 are numbered in the 100 series and have the same last two digits as the corresponding components, if any, in the FIG. 2 embodiment. Radiant energy from source 118 is split two ways by the 1×2 splitter 160 into paths 170 and 171. The light from splitter 160 is split in two different portions and transported through paths 170 and 171 to the corresponding first and second transmission units 112F and 112S. The lengths of paths 170 and 171 may differ by amounts equal to a 1000 times the coherence length but may be less. Such a difference in the length of paths 170 and 171 will eliminate the possibility that light through a path in transmission unit 112F will interfer with light through a path in transmission unit 112S. Each of the transmission units 112F and 112S is constructed in the same fashion as transmission unit 12 in FIG. 2 except that the transmission units of FIG. 3 do not have a source of radiant energy, but instead receive a portion of the radiant energy from source 118 by way of the splitter 160. Each of the transmission units 112F and 112S will be recognized as a pair of Mach-Zehnder interferometer configurations sharing a common reference path. The transmission units 112F and 112S are identical except that they have respective path length differences of $\Delta L_1$, $\Delta L_2$, $\Delta L_3$, and $\Delta L_4$, which are shown in parentheses within the various Mach-Zehnder configurations. The respective path length differences are sufficiently different (by an amount about five times the coherence length of the source 118 or less) from each other that each of the transmission units may apply a signal to the transmission path 116 by way of the coupler 162, but without the various signals interfering with each other. As in the arrangement of FIG. 2, the path length differences should be greater than five times the coherence length of source 118. The transmission units 112F and 112S may use integrated optic waveguides upon a single electro-optic substrate (not separately shown). Although the transmission units are shown as Mach-Zehnder configuration units, they alternately may be Michelson or other configurations.

The signals sent from site A along transmission path 116 are split by a splitter 164 at site C for passage into first and second receiver units 114F and 114S. Each of the receiver units are constructed in like fashion to receiver unit 14 of FIG. 2. However, units 114F have respectively path length differences $\Delta L_1$ and $\Delta L_2$ and units 114S have respectively path length differences $\Delta L_3$ and $\Delta L_4$ as indicated parenthetically below the numerals of the corresponding receiver units designated 129T, 129U, 129V, and 129W. Accordingly, each of the receiver units 129T, 129U, 129V, and 129W is used for detecting signals from the corresponding one of the transmission units at site A.

Although specific telecommunication signals are not shown applied to the phase modulators of the transmission units 112F, and 112S and for the embodiments discussed below, such signals would be applied to the various phase modulators in those transmission units. The signals applied may be the output of multiplexers or other devices having analog or time division multiplexed signals of various protocols. These may be mixed in any combination.

Figure 4:
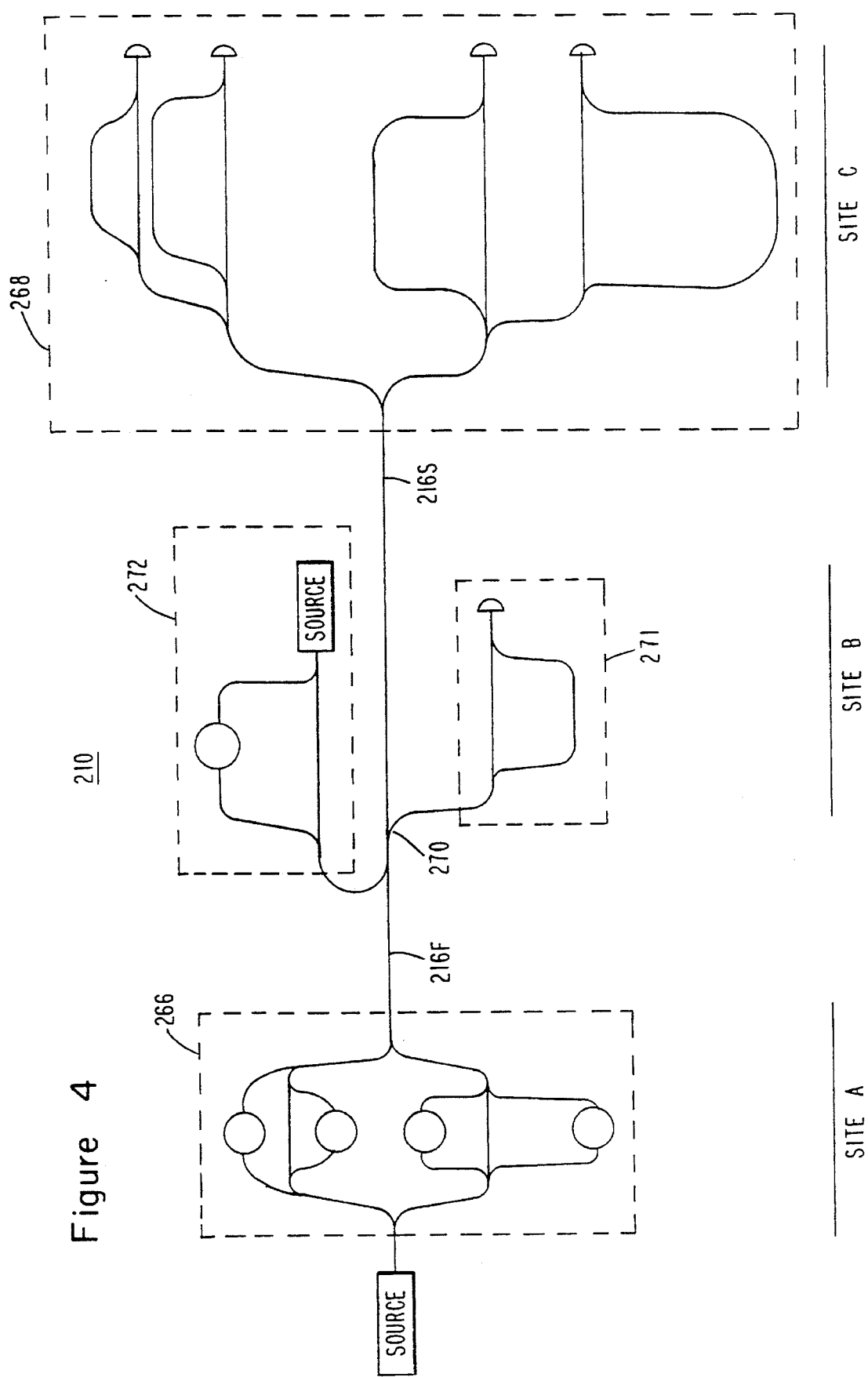
FIG. 4 shows a third embodiment telecommunications system according to the present invention wherein a drop/insert technique is obtained by use of an intermediate station.

Turning now to FIG. 4, a drop/insert configuration for the present invention is shown with components numbered in the 200 series with the last two digits as the corresponding component, if any, of the FIG. 2 embodiment. The telecommunications system 210 of FIG. 4 includes a transmitter system 266 at site A and receiver system 268 at site C which are identical respectively to the structures at sites A and C in the FIG. 3 embodiment. Therefore, these components need not be discussed in detail. The transmission path between site A and site B includes first and second portions 216F and 216S attached by a coupler/splitter 270. The 2×2 coupler/splitter 270 has one output port connected to the transmission path, such as optical fiber, 216S. Its other output port is connected to a Mach-Zehnder receiver unit 271 (constructed and operational as described with respect to one of the receiver units in 14 of FIG. 2). Unit 271 has a path length difference matching one of the transmitter units at transmitter system 266, site A and will detect signals therefrom. One of the input ports of coupler/splitter 270 is connected to transmission path 216F, whereas the other input port is connected to a transmitter unit 272, constructed and operational as described with respect to one of the Mach-Zehnder configurations in transmitter unit 12 of FIG. 2. The signals applied by transmitter unit 272 passes along transmission path 216S to site C where detection and demodulation may occur by use of a receiver unit having a path length difference corresponding to the path length difference of the Mach-Zehnder of unit 272.

An alternate embodiment includes a multiport coupler/splitter to accommodate multiple drop/insert units at the single site B.

Still another embodiment includes more than one intermediate drop/insert sites containing one or more transmission and receiver units.

Figure 5:
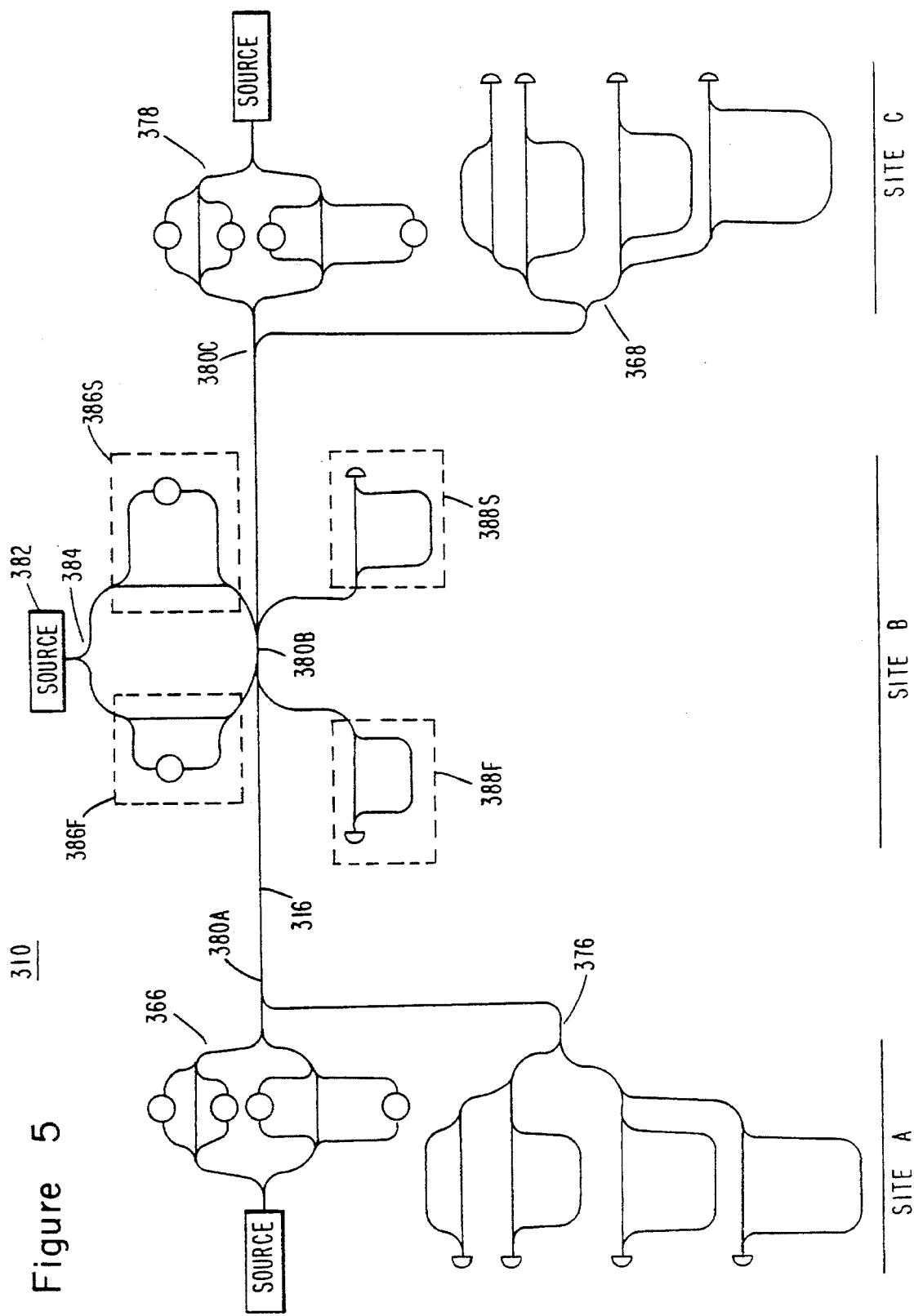
FIG. 5 shows a fourth embodiment telecommunication system according to the present invention which provides full duplex transmission and a drop/insert capability at an intermediate station.

Turning now to FIG. 5, a full duplex communication system incorporating a drop/insert multiplexer is shown. The optical telecommunication system 310 of FIG. 5 has numbers in the 300 series with the same last two digits as the corresponding component, if any, from one or more of the previous embodiments. At site A, a transmission unit 366 consisting of a multiplexed arrangement of two pairs of Mach-Zehnder interferometers as shown in FIG. 3 and at site C a multiplexed arrangement of four receiver interferometers 368 similar to those shown in FIG. 3 are constructed and operational as discussed with respect to the corresponding components 266 and 268 of FIG. 4. However, since the FIG. 5 arrangement is full duplex, site A also includes an assembly 376 of four multiplexed receiver units, constructed and operational in the same fashion as receiver unit 268 described previously. Likewise, site C includes a transmission unit 378 which has two pairs of Mach-Zehnder transmitter units and is constructed and operational as discussed with respect to transmission unit 266. At site A, a coupler/splitter 380A directs communication sent to site A from site B or C towards the receiver unit 376 and allows outgoing signals from transmission unit 366 to be applied to a transmission path 316. Coupler/splitter 380C performs the same function at site C.

Site B, located intermediate sites A and C has a 3×3 coupler/splitter 380B. (The sites would, as always, be at different locations form each other). A source 382 provides radiant energy to an associated splitter 384 which supplies first and second Mach-Zehnder configuration transmission units 386F and 386S. The transmission units 386F and 386S operate in identical fashion to one of the Mach-Zehnder configurations in transmission unit 12 described in detail with respect to FIG. 2. The output from the transmission units is applied to the transmission path 316 by way of the coupler/splitter 380B. Signals intended for site B may be detected by first and second Mach-Zehnder configuration receiver units 388F and 388S, each of which is constructed and operational in similar fashion to that described for reception unit 14 of FIG. 2. Receiver 388F is used to receive signals sent by site C whereas receiver 388S is used to receive signals sent by site A.

The transmitter unit 386F is used to send signals to site C, whereas transmitter unit 386S is used to send signals to site A. As will be readily understood, the path length difference in a particular receiving unit should match the path length difference in the corresponding transmitter unit.

Although specific constructions and embodiments have been presented herein, these are for illustrative purposes only. Various modifications will be apparent to those of skill in the art. Accordingly, the scope of the present invention will be determined by reference to the claims appended hereto.

What is claimed is:

1. An optical telecommunication system including N transmission units, each comprising:

a source of radiant energy having a coherence length;

separate N+1 optical paths where N is the number of signals to be transmitted and one path is used as a reference and the other N paths are selected so that their lengths differ from the reference path by an amount $\Delta L_1, \Delta L_2, \ldots, \Delta L_N$ where all such path length differences and the differences $\Delta L_k - \Delta L_j$ (where k and j individually and separately take all values between 1 and N but k≠j) are greater than five times the coherence length or less and the differences $\Delta L_k - \Delta L_j$ do not equal any path length difference $\Delta L_1, \Delta L_2, \ldots, \Delta L_N$;

means for dividing radiant energy from said source into N+1 portions for passage respectively along said N+1 optical paths and for recombining said N+1 optical portions after passage along said N+1 optical paths;

a phase modulator in each of said N optical paths operable for applying a telecommunications signal to said N portions;

said N transmission units operably connected to provide said recombined portions with phase differences corresponding to $\Delta L_1, \Delta L_2, \ldots, \Delta L_N$ to a transmission path having a first end adjacent said first transmission unit and a second end; and a first receiver unit operably connected to said second end of said transmission path and having:

N separate pairs of first and second reception paths having path length differences $\Delta L_1, \Delta L_2, \ldots, \Delta L_N$ and means for dividing the N portions for passage selectively to the N pairs of first and second reception paths;

each of the first and second reception pairs having a means for dividing that portion of the radiant energy from the source into first and second portions for passage respectively along the first and second paths and for recombining the first and second portions after passage along the first and second paths; and N first sensors separately and individually connected to the means for reseparating and recombining the N pairs of first and second reception paths, each first sensor operable to sense radiant energy for detection of the telecommunication signal applied to the first transmission unit having the same path length difference; and wherein said first transmission unit, transmission path, and said first receiver unit collectively are N interferometers.

2. The optical telecommunication system of claim 1 further comprising a second transmission unit constructed in like manner as said first transmission unit, a transmission splitter connected to split radiant energy from said source into portions directed through separate paths to said first and second transmission units, a transmission coupler connected to combine radiant energy which has passed through said first and second transmission units and connected to said transmission path; and further comprising a second receiver unit constructed in like fashion as said first receiver unit and operably connected to said second end of said transmission path; and wherein said first and second receiver units respectively detect signals applied to said first and second transmitter units.

3. The optical telecommunication system of claim 2 where the lengths of the said path to the first and second transmission units may differ by 1000's of coherence lengths but may be more or less.

4. The optical telecommunication system of claim 1 wherein said means for dividing and recombining and said N+1 optical paths are part of N Mach-Zehnder configurations sharing a common reference path.

5. The optical telecommunication system of claim 1 wherein said means for dividing and recombining comprises a splitter connected to split the radiant energy separately and individually into the N+1 portions and a coupler to recombine the N+1 portions.

6. The optical telecommunication system of claim 1 wherein said means for dividing and recombining and said N+1 optical paths are part of N Michelson interferometers sharing a common reference path.

7. The optical telecommunication system of claim 6 wherein said means for dividing and recombining comprises a coupler/splitter.

8. The optical telecommunication system of claim 1 wherein said N+1 optical paths separately and individually are optical fibers.

9. The optical telecommunication system of claim 1 wherein said N+1 optical paths separately and individually are single-mode integrated optic waveguides.

10. The optical telecommunication system of claim 1 wherein said source is a laser.

11. The optical telecommunication system of claim 1 wherein said source is a superluminescent diode.

12. The optical telecommunication system of claim 1 wherein two optical sources are provided for redundancy and including a means for selecting a specific one of said sources.

13. The optical telecommunications system of claim 12 wherein the means for selecting the specific optical source is a remotely controlled optical switch.

14. The optical telecommunication system of claim 1 wherein phase modulators are located on one path of each receiver pair.

15. The optical telecommunication system of claim 1 wherein an optical tap is provided at the output from the transmission unit for redundancy and diagnostic purposes.

16. The optical telecommunication system of claim 15 wherein said optical tap is a multiport fiber optic splitter.

17. The optical telecommunication system of claim 15 wherein said optical tap is a remotely controlled multiport optical switch.

18. The optical telecommunication system of claim 1 wherein an optical combiner is provided at the input of the receiver unit for redundancy and diagnostic purposes.

19. The optical telecommunication system of claim 18 wherein said optical tap is a multiport fiber optic splitter.

20. The optical telecommunication system of claim 18 wherein said optical tap is a remotely controlled multiport optical switch.

21. The optical telecommunication system of claim 1 wherein an optical isolator is provided immediately before each receiver unit in order to prevent back reflections for secure and full duplex operation.

22. An optical telecommunication system comprising:

a source of radiant energy having a coherence length, and N transmission units, each having:

separate N+1 optical paths where N is the number of signals to be transmitted and one path is used as a reference and the other N paths are selected so that their lengths differ from the reference path by an amount $\Delta L_1, \Delta L_2, \ldots, \Delta L_N$ where all such path length differences and the differences $\Delta L_k - \Delta L_j$ (wherein k and j each take on all values between 1 and N but k≠j) are greater than approximately five times the coherence length and the differences $\Delta L_k - \Delta L_j$ do not equal any path length difference $\Delta L_1, \Delta L_2, \ldots, \Delta L_N$;

means for dividing radiant energy from said source into N+1 portions for passage respectively along said N+1 optical paths and for recombining said N+1 optical portions after passage along said N+1 optical paths;

a phase modulator in each of said N optical paths operable for applying a telecommunications signal to said N portions;

said N transmission units operably connected to provide said recombined portions with phase differences corresponding to $\Delta L_1, \Delta L_2, \ldots, \Delta L_N$ to a transmission path having a first end adjacent said first transmission unit and a second end;

and a first receiver unit operably connected to said second end of said transmission path and having;

N separate pairs of first and second reception paths having path length differences $\Delta L_1, \Delta L_2, \ldots, \Delta L_N$ and means for reseparating the N portions for passage selectively to the N pairs of first and second reception paths;

each of the first and second reception pairs having a means for dividing that portion of the radiant energy from the source into first and second portions for passage respectively along the first and second paths and for recombining the first and second portions after passage along the first and second paths; and N first sensors separately and individually connected to the means for reseparating and recombining the N pairs of first and second reception paths, each first sensor operable to sense radiant energy for detection of the telecommunication signal applied to the first transmission unit having the same path length difference; and wherein said first transmission unit, transmission path, and said first receiver unit collectively are N interferometers.

23. The optical telecommunication system of claim 22 further comprising a second transmission unit constructed in like manner as said first transmission unit, a transmission splitter connected to split radiant energy from said source into portions directed separately to said first and second transmission units, a transmission coupler connected to combine radiant energy which has passed through said first and second transmission units and connected to said transmission path; and further comprising a second receiver unit constructed in like fashion as said first receiver unit and operably connected to said second end of said transmission path; and wherein said first and second receiver units respectively detect signals applied to said first and second transmitter units.

24. The optical telecommunication system of claim 22 further comprising a plurality of transmission units constructed in like manner as said first transmission unit, a transmission splitter connected to split radiant energy from said source into portions directed separately to said transmission units, a transmission coupler connected to combine radiant energy which has passed through said transmission units and connected to said transmission path; and further comprising a plurality of receiver units constructed in like fashion as said first receiver unit and operably connected to said second end of said transmission path; and wherein said receiver units respectively detect signals applied to said transmitter units.

25. The optical telecommunication system of claim 23 further comprising a second transmission unit constructed in like fashion to said first transmission unit and operably connected to said second end of said transmission path, and a second receiver unit constructed in like fashion of said first receiver unit and operably connected to said first end of said transmission path; and wherein said first and second receiver units respectively detect signals applied to said first and second transmitter units such that full duplex communication is provided.

26. The optical telecommunication system of claim 23 further comprising an intermediate station on said transmission path between its first and second ends, said intermediate station including a second transmission unit constructed in like fashion to said first transmission unit and operably connected to an intermediate location of said transmission path, and a second receiver unit constructed in like fashion as said first receiver unit and operably connected to an intermediate location of said transmission path.

* * * * *